United States Patent Office 3,449,749
Patented June 10, 1969

3,449,749
ELECTROMAGNETIC SURVEILLANCE SYSTEM
William J. McEvoy, 5081 Aurora Drive,
Ventura, Calif. 93003
Filed June 24, 1968, Ser. No. 739,447
Int. Cl. G01s 5/02; G01r 23/16; H04b 1/36
U.S. Cl. 343—113         10 Claims

ABSTRACT OF THE DISCLOSURE

A microwave electromagnetic surveillance system designed to receive and analyze electromagnetic radiation in the range lying between 1 and 18 gHz. The system comprises four modules respectively associated with acquisition, control, analysis, and recording. The spectrum is divided into five bands, each with fully electronic tuning by means of yttrium-iron-garnet (YIG) filters as pre-selectors. YIG tuning is also used in the oscillator networks. A memory module is included to permit programming the spectrum such that certain frequencies may be recalled, or bands of frequencies locked out. The system further features digital frequency tuning; direct decimal readout of frequency, pulse repetition period, and pulse length; panoramic display of the entire spectrum; spectrum analysis; and antenna control for direction finding.

---

The invention described herein may be manufactured and used by or for the Government of the United States of America for governmental purposes without the payment of any royalties thereon or therefor.

Background of the invention

There is at the present time an increasing need for a spectrum analyzer, or panoramic receiver, which is capable of scanning periodically over a wide band of frequencies to detect and indicate the nature of signals which lie within such band. The demand for such equipment has risen in recent years due in large part to the testing and evaluation of guided missiles and satellites by the government in connection with space exploration and the defense program. During such testing, both the transmission of command information to the vehicle, as well as telemetered data therefrom with respect to its performance, requires a portion of the frequency spectrum which is substantially free from interfering radiation. Since the finite nature of the radio frequency spectrum is such that separate frequencies cannot ordinarily be assigned exclusively for military test range use, it follows that the coordination of frequency resources requires effective, efficient and prudent administration to insure electromagnetic interference-free environments for all military and commercial activities within a given area. Such close supervision and regulation of spectrum utilization is especially important both at, and in the vicinity of, all missile and aeronautcal test facilities.

Although so-called panoramic receivers are now available, they all possess one or more of the following drawbacks: (1) poor sensitivity, (2) abbreviated frequency coverage, (3) a slow tuning rate, and (4) poor frequency accuracy resulting in unnecessarily wide guard bands. In addition, their operation is usually manual, and the data displays must, for the most part, be visually observed, interpreted and correlated.

Summary of the invention

A microwave surveillance system for detecting and analyzing electromagnetic emissions in the frequency range of 1 to 18 gHz. The invention apparatus is capable of operating in areas of extreme electromagnetic signal density created by industrial complexes, government services, and military activities, as well as by the operations of vessels at sea. It solves the problem of identifying, locating and effecting coordination with sources of radiation which interfere with other authorized users of the radio frequency spectrum.

The invention system consists basically of equipment performing the four signal functions of acquisition, control, analysis and recording. Each function is represented by one or more modules. The system is capable of detecting and categorizing the parameters of all currently-used types of electromagnetic emission. Due to system flexibility and automatic digital computer functions, rapid signal acquisition and analysis is performed. Data resulting from signal analysis is printed out and transmitted directly without the need for manual or visual translation by the operator.

The invention apparatus is designed to cover the entire 1 to 18 gHz frequency spectrum with a continuous sweep. To give maximum signal-to-noise ratios throughout the spectrum and to provide optimum system flexibility, the spectrum is divided into five standard microwave bands. There is no mechanical tuning involved within these bands, nor mechanical switching required between bands. Fully electronic tuning is a result of incorporating of (YIG) filters as pre-selectors and in oscillators. A memory module is included to permit programming the spectrum such that certain frequencies may be recalled, or bands of frequencies automatically locked out.

Other features of the invention apparatus include digital frequency tuning (both manual and automatic); direct digital readout of frequency, pulse repetition period, and pulse length; panoramic display of the entire frequency spectrum (in five bands) with integral photographic capability; frequency readout with 100 kc./sec. accuracy; band width, IF mode, and signal type selection; and antenna control for direction finding with a separate display unit.

One object of the present invention, therefore, is to provide an improved form of spectrum analyzer or panoramic receiver.

Another object of the invention is to provide an improved form of microwave electromagnetic surveillance system which employs no mechanical tuning but instead makes use of electrically-tracked pre-selectors and oscillators.

A further object of the invention is to provide an improved form of electromagnetic surveillance system which utilizes modular components throughout.

A still further object of the invention is to provide an improved electromagnetic surveillance system which provides continuous spectrum coverage by means of automatically-switched frequency bands.

An additional object of the invention is to provide an improved form of electromagnetic surveillance system which incorporates both digital tuning and direct digital readout.

An additional object of the invention is to provide a panoramic receiver having a memory unit with an instant recall capability to within 0.1 mc./sec.

Other objects, advantages, and novel features of the invention will become apparent from the following detailed description of the invention when considered in conjunction with the accompanying drawings.

Description of the preferred embodiment

Figure 1:
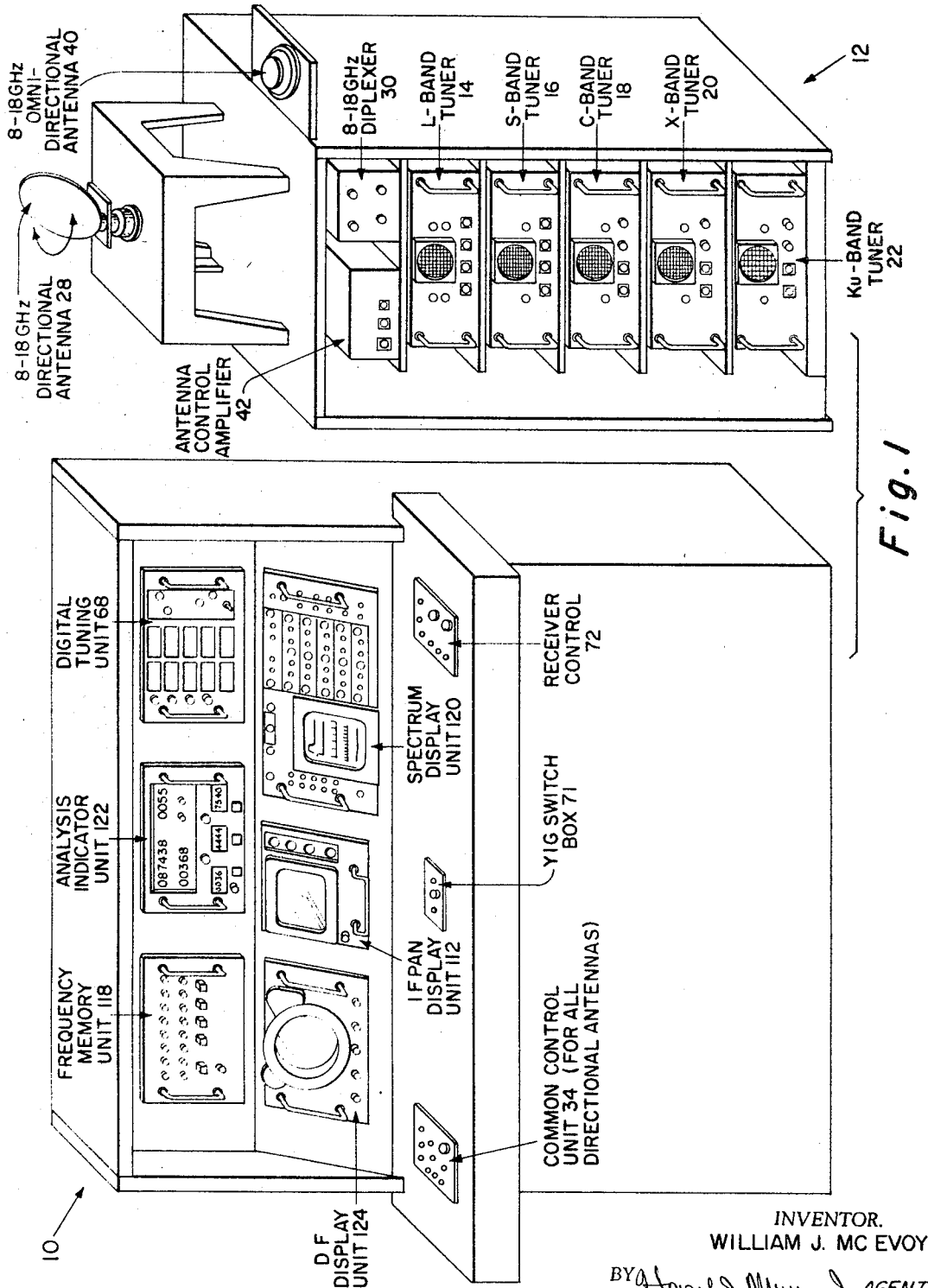
FIG. 1 of the drawings is a front view of a console embodying the microwave electromagnetic surveillance system of the present invention, together with a separate companion unit including a portion of the antenna system as well as separate tuners for each of the microwave bands.

A physical embodiment of a microwave electromagnetic surveillance system designed in accordance with a preferred form of the present invention is illustrated in FIGURE 1 of the drawings. It consists of a console 10 together with a companion unit 12. Due to the modular nature of the components making up the units 10 and 12, the invention apparatus is especially suitable for airborne use, but it is also capable for other mobile as well as fixed station applications. A block diagram of the electrical circuits utilized in the apparatus of FIG. 1 is set forth in FIG. 2 of the drawings.

(1) SIGNAL ACQUISITION

Five RF tuning units process incoming signals and provide the first conversion to a nominal 250 mHz. IF output. These five tuning units (identified in FIGURES 1 and 2 of the drawings by the reference numerals 14 through 22) are respectively associated with each of the microwave bands L, S, C, X and $K_u$. Each tuning unit contains a YIG pre-selector and post-selector to provide image and spurious response rejection for the first IF conversion. A detailed description of a representative RF tuning unit will be set forth hereinafter in connection with a description of FIGURE 4 of the drawings. At that point it will be also shown that a travelling wave amplifier is interposed between the YIG filters to insure adequate low-noise amplification, and that a local oscillator is provided to tune each band in 100 mHz. increments.

(a) Diplexers

Figure 2:
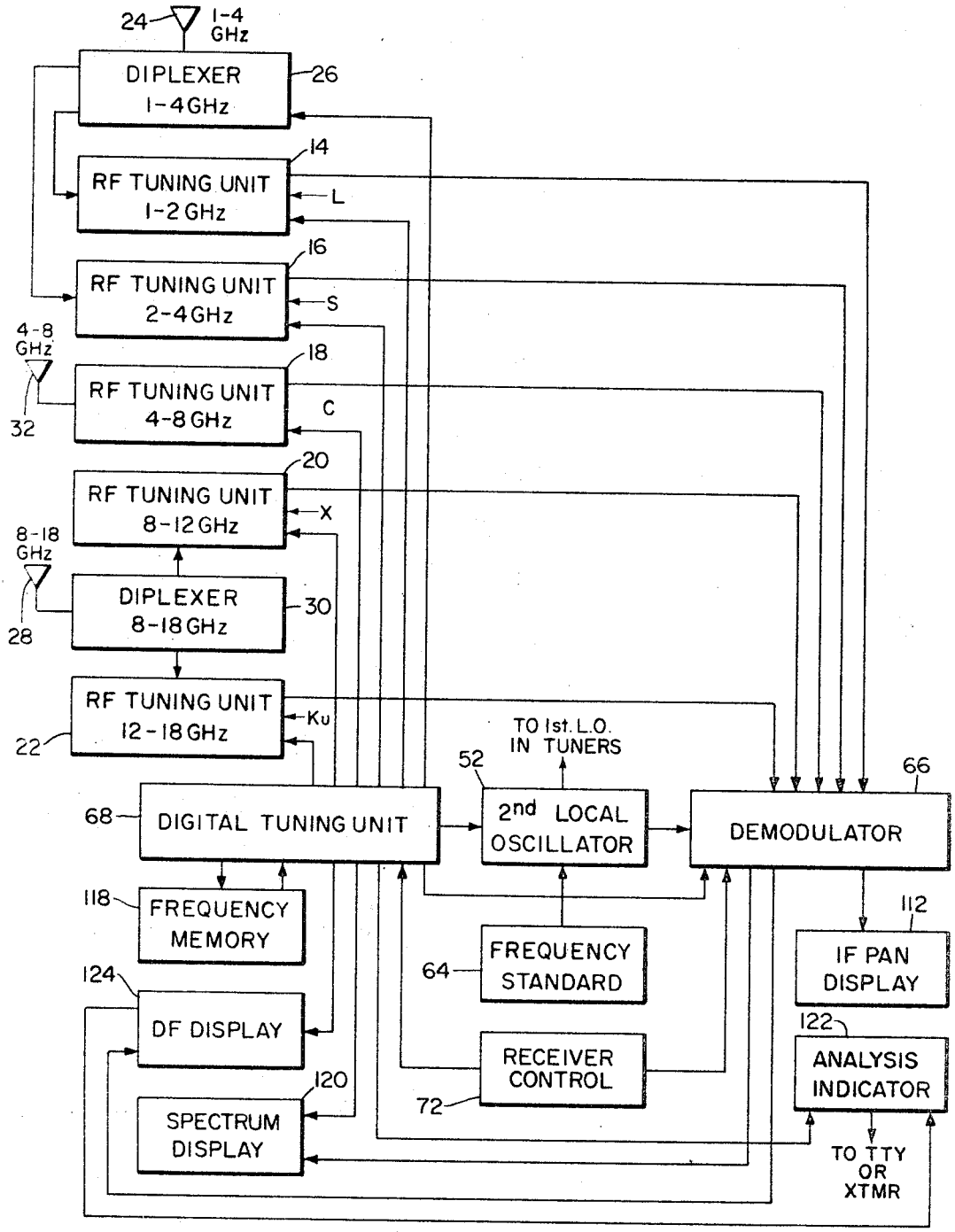
FIG. 2 is a block diagram of a microwave electromagnetic surveillance system designed in accordance with that embodiment of the present invention set forth in FIG. 1.

The invention system is designed for use with three separate directional antennas, and includes two diplexer units which split the incoming RF energy. As illustrated in FIGURE 2, a 1 to 4 gHz. antenna 24 feeds incoming signals to a diplexer 26 which in turn is connected to the two RF tuning units 14 and 16 covering the L and S bands, respectively. In similar fashion, an 8 to 18 gHz. antenna 28 provides signal energy to diplexer 30 which supplies the RF tuning units 20 and 22 respectively covering the X and $K_u$ bands. A third 4 to 8 gHz. antenna 32 supplies incoming energy directly to the RF tuning unit 18 covering the C band. The 1 to 4 gHz. diplexer 26 divides the RF energy into two bands of 1 to 2 gHz. and 2 to 4 gHz., respectively. The 8 to 18 gHz. diplexer 30 divides the RF energy into two bands of 8 to 12 gHz. and 12 to 18 gHz., respectively. Only the 8 to 18 gHz. antenna 28 is illustrated in FIGURE 1 of the drawings. The other two antennas 24 and 32, although not shown, are regulated in common with antenna 28 from a unit 34 the controls of which are available to the operator of console 10.

Figure 3:
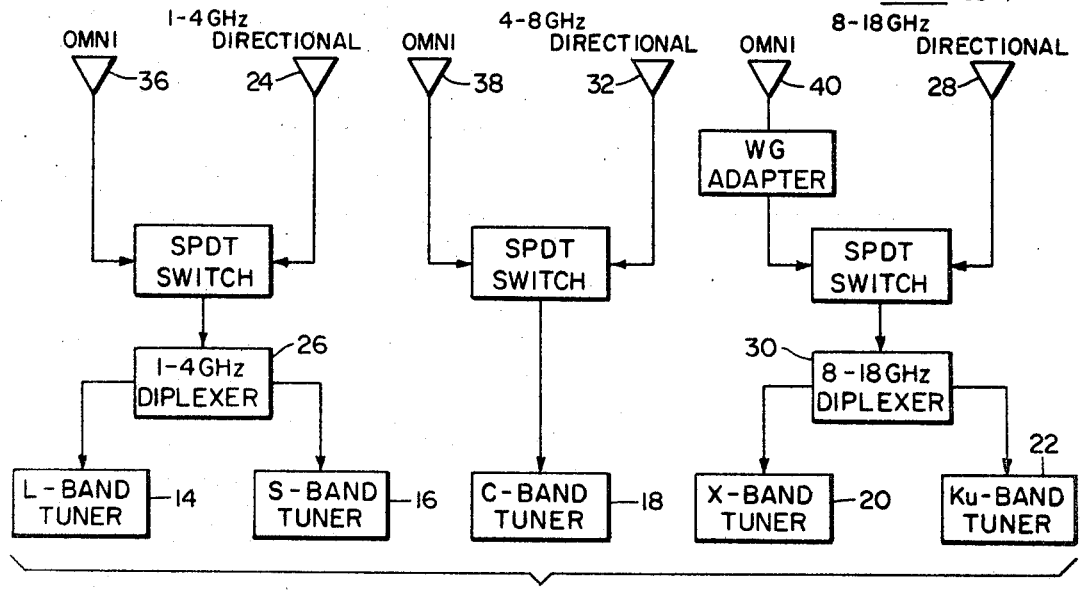
FIG. 3 is a schematic showing of the antenna system used in the present concept.

The above-described system of antennas, diplexes and tuners will be more clearly understood from FIGURE 3 of the drawings, in which the various interconnections between these components are clearly set forth. No reference has been made to the omni-directional antennas used in the present system, since these may be of a conventional nature. However, each of the three directional antennas 24, 32 and 28 has associated therewith an omni-directional antenna, respectively designated in FIGURE 3 of the drawings by the reference numerals 36, 38 and 40. The omni-directional antenna 40 for the 8 to 18 gHz. band is illustrated in FIGURE 1 of the drawings as forming part of the companion console unit 12.

The 8 to 18 gHz. antenna 28 is a high-speed, rotating unit used for direction finding, being dynamically balanced for rotational speeds of 360 revolutions per minute. It is a reflector type antenna with a circularly-polarized wave guide and a transition to a double-ridged wave guide output, thus enabling it to receive the full 8 to 18 gHz. range of frequencies. At the upper portion of this range it has a gain of 22 decibels and is adapted to receive both vertically and horizontally polarized signals. The 8 to 18 gHz. omni-directional antenna 40 is a circularly-polarized antenna housed in a small radome, as shown in FIGURE 1 of the drawings. It has an azimuth pattern which is omni-directional within 1.5 decibels.

The diplexers 26 and 30 are designed to have a pass band insertional loss of less than 1 decibel. Diplexer 26 is a time-multiplexed frequency divider, and switching between the output terminals occurs coincidentaly with band switching. It is accomplished by a command signal from a digital tuning unit to be described in connection with FIG. 4 of the drawings. Diplexer 30 consists of a plurality of band separation filters.

(b) DF Antenna control system

The DF antenna control system includes the unit 34 of FIG. 1 together with an amplifier 42 and a driving mechanism (not shown) for rotating the 8 to 18 gHz. directional antenna 28 of FIG. 1 as well as the other directional antennas 24 and 32 (not shown in FIGURE 1 of the drawings). The unit 34 contains the operator controls, while the driving mechanism is designed to either spin the antenna at a constant speed set by the operator, or permit it to be slewed manually. When switched to spin mode, the operator may vary the spin speed to 380 revolutions per minute. When the switch is in the manual mode, the operator can slew the antenna in either direction. In cases where the invention apparatus is installed on an aircraft, means are provided whereby the antenna 28 may be always pointed toward a particular signal the operator has chosen, regardless of any change in aircraft direction.

(c) RF tuning units

Figure 4:
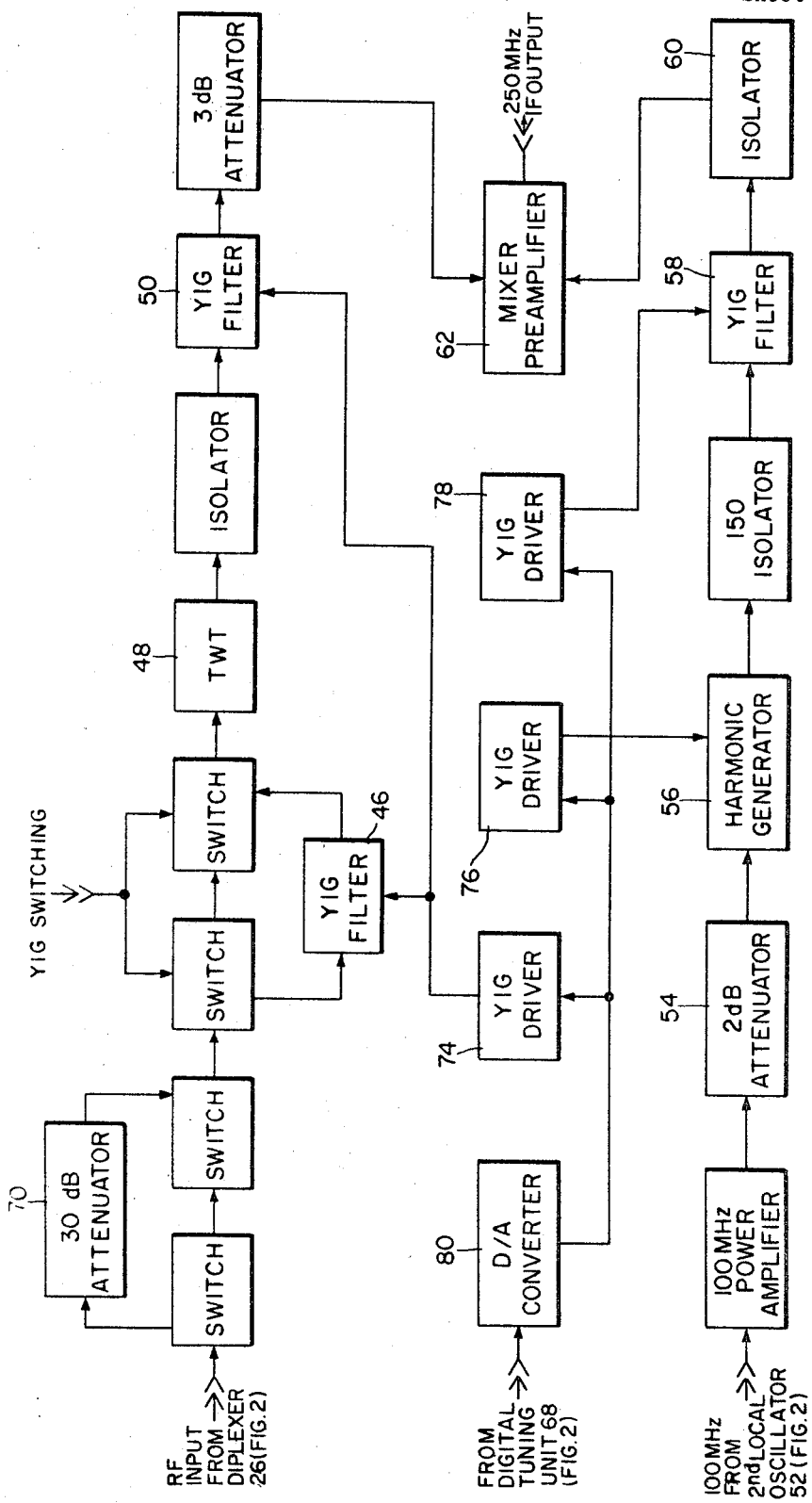
FIG. 4 is a simplified block diagram of the L-band RF tuner utilized in the present concept and set forth in FIG. 2.

The fundamental principle of operation is the same for all five RF tuning units 14 through 22. Selecting the L band tuner 14 as an example, it will be seen from FIGURE 4 of the drawings that this unit is electronically-tuned by yttrium-iron-garnet (YIG) filters. As illustrated in FIG. 4, RF signals received from the diplexer 26 are fed to a first YIG filter 46 and then amplified by a travelling wave tube 48. This travelling wave tube 48, in addition to amplifying the RF signals, also helps to establish the noise figure of the overall tuning unit. After amplification, the RF signal is again filtered by a second YIG component 50.

A 100 mHz. signal from the second local oscillator 52 of FIG. 2 is fed through a 2 db attenuator 54 and into a YIG-driven harmonic generator 56. The harmonic generator 56 generates a comb of frequencies spaced every 100 mHz. up to and including the $K_u$ band. The integrated YIG filter in tuned to select the frequency required for the mixer preamplifier 62. The integrated YIG in the harmonic generator 56 also rejects the undesired frequencies.

The output of the harmonic generator 56 is then fed into YIG filter 58 where further rejection of the undesired harmonics is provided, thereby allowing only the desired frequency to pass. The output of YIG filter 58 is applied through an isolator 60 to a mixer pre-amplifier 62 where it is combined with the filtered RF signal from the YIG filter 50. The result is a 250 mHz. IF wave which is sent to a demodulator unit (FIG. 2) for further amplification and detection. The cascaded YIG filters 46 and 50 provide approximately 24 db per octave selectivity with a nominal 30 mHz. bandwidth to give sharp tuning of the received RF signal. Image frequency and spurious rejection are greater than 50 db. The mixer pre-amplifier 62 incorporates a balanced mixer and a solid-state pre-amplifier to provide the 250 mHz. IF output frequency at a power gain of 25 db.

In the $K_u$ band RF tuning unit, the harmonic generator (corresponding to that identified by the reference numeral 56 in FIG. 4) is followed by a travelling wave tube amplifier to increase the output level. The S band RF tuner is similar to that of the L band tuner shown in FIG. 4 in that the harmonic generator is coupled directly to the mixer pre-amplifier without additional amplification.

Operation of the second local oscillator 52 in FIG. 2 is controlled by the frequency standard 64. This standard 64 consists of an ultra-stable crystal oscillator capable of delivering a set of separate phase-coherent signal frequencies that range from 3 mHz to 39 mHz. The unit 64 feeds these frequencies to the second local oscillator 52 which generates the 100 mHz. drive for application to the harmonic generator 56 of FIG. 4, and a further 260 to 360 mHz. frequency to a demodulator unit 66, shown in FIG. 2 of the drawings. The second local oscillator output is stepped from 260 to 360 mHz. in 100 kilocycle increments. Such stepping is controlled by a digital tuning unit 68 shown in FIGS. 1, 2 and 5.

In the normal mode of operation of the L band RF tuner shown in FIG. 4, a 30 db attenuator 70 is selectively switched out of the signal path. The first YIG filter 46 is selectively switched into or out of the signal path by operation of the control 71 as shown in FIG. 1 of the drawing. This attenuator 70 is switched into the signal path whenever the signal level is greater than the maximum input capacity of the tuner. The attenuator control is located on the front panel of a receiver control unit 72 shown in FIG. 1 of the drawings, and also in the block diagram of FIG. 2. When the YIG filter 46 is switched out of the RF signal path, a 3 db improvement in noise figure is achieved.

It will be noted from FIG. 4 that the YIG filters 46 and 50 in the RF signal path are driven by the YIG driver unit 74, while the YIG forming part of the harmonic generator 56 is similarly driven by a YIG driver unit 76. A further YIG driver 78 drives the YIG filter 58. All of the YIG drivers 74, 76 and 78 of FIG. 2 are controlled by a signal from the digital tuning unit 68 after passing through a digital-analog converter 80.

(d) *Demodulator*

Figure 5:
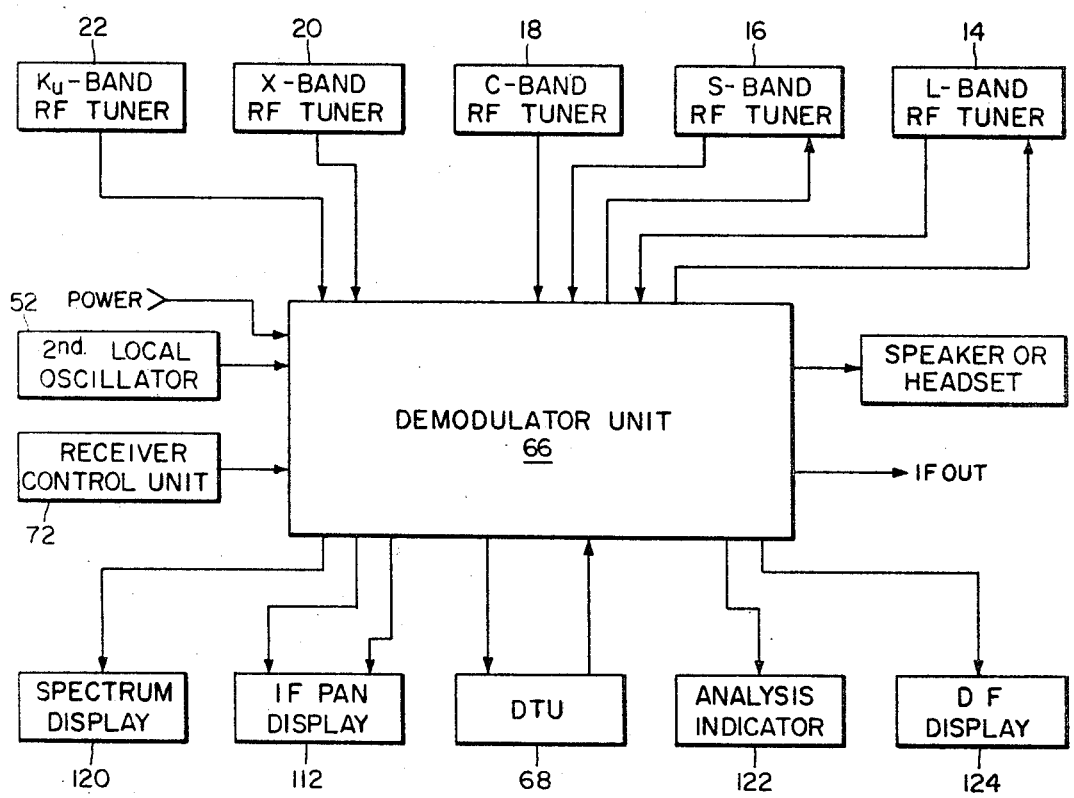
FIG. 5 is a block diagram of the connections to the demodulator unit of FIG. 2.
Figure 6:
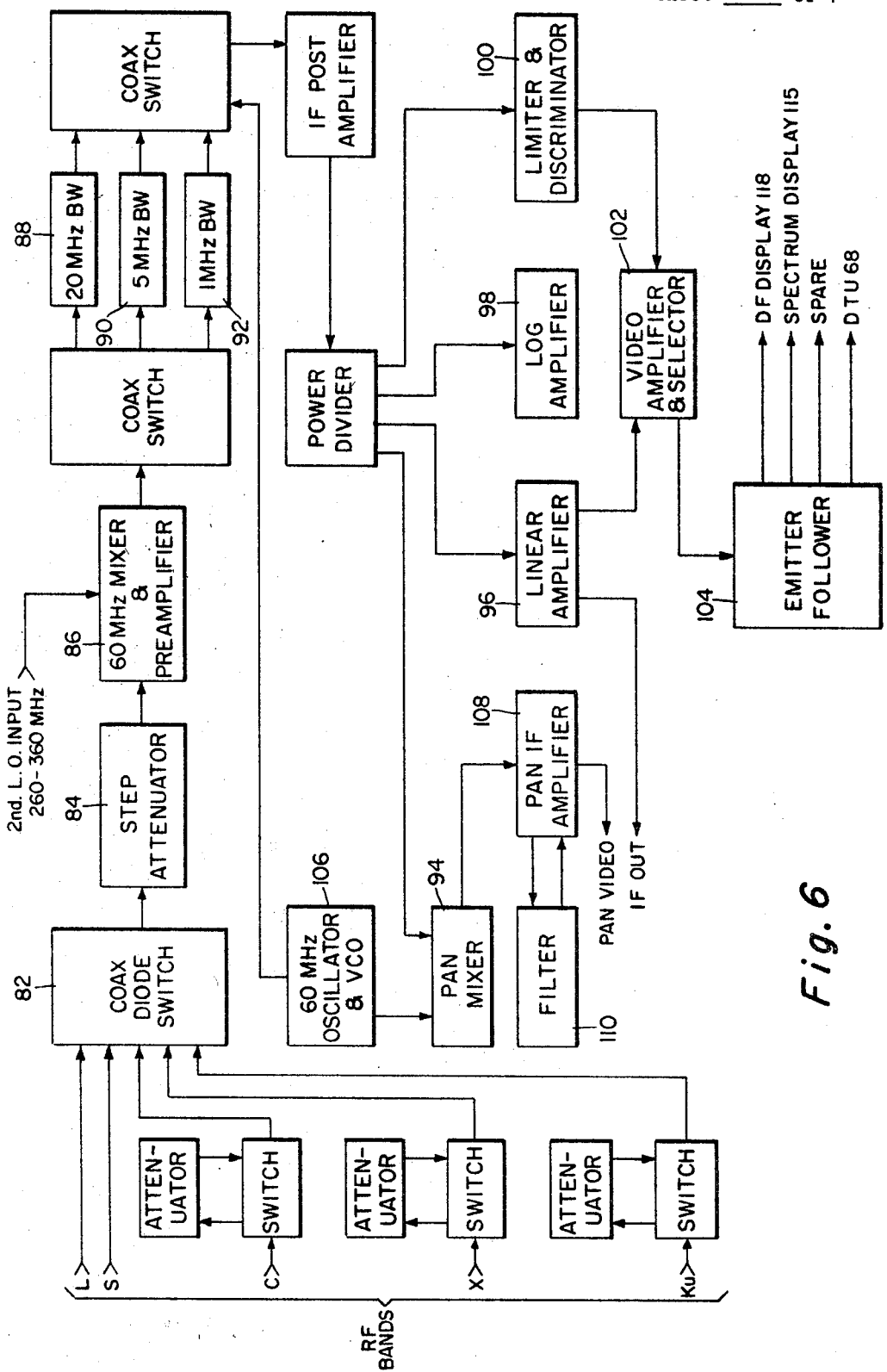
FIG. 6 is a block diagram of the signal paths within the demodulator unit of FIG. 5.

The demodulator 66 of FIGS. 2 and 5 is shown in detail in FIG. 6, and accepts the 250 mHz. IF output from the appropriate one of the RF tuning units 14 through 22. The proper tuning unit is selected by a diode band switch 82 and fed to an IF attenuator 84. When mixed with the output from the local oscillator (see FIG. 2) the resultant IF frequency becomes 60 mHz. Hence, the 60 mHz. pre-amplifier 86 is at least 25 mHz. wide, and the 20, 5 and 1 mHz. bandwidths are determined by passive switch-in type filters 88, 90 and 92 in the amplifier chain. Selection of the desired filter bandwidth is accomplished from the receiver control unit 72 (see FIGS. 2 and 5).

The 60 mHz. information is split, portions being fed to an IF pan displayed unit mixer 94, to a pair of AM detectors, and to an FM detector. The AM amplifier/detector consist of a linear IF amplifier 96 and a logarithmic IF amplifier 98, while the FM detector consists of a discriminator 100. Selection of either linear or logarithmic amplifiers, AM or FM mode of operation is achieved by the receiver control unit 72 of FIG. 5. The limiter and discriminator 100 is followed by a variable gain video amplifier 102, the output of which is fed to the various display circuits through an emitter-follower 104, and is also available as an external output.

The pan mixer 94 of FIG. 6 has a 60 mHz. input from the voltage-controlled oscillator 106, the latter thus acting as the pan local oscillator. The result is a 15 mHz. IF signal which is then fed through a pan IF amplifier-filter combination 108, 110 for detection. The video output goes to the IF pan display unit 112 of FIGS. 1, 2 and 5.

(2) SIGNAL CONTROL

Control of the microwave electromagnetic surveillance system of the present invention is accomplished with three units: (a) digital tuning unit, (b) the receiver control unit, and (c) the frequency memory unit.

(a) *Digital tuning unit*

Figure 7:
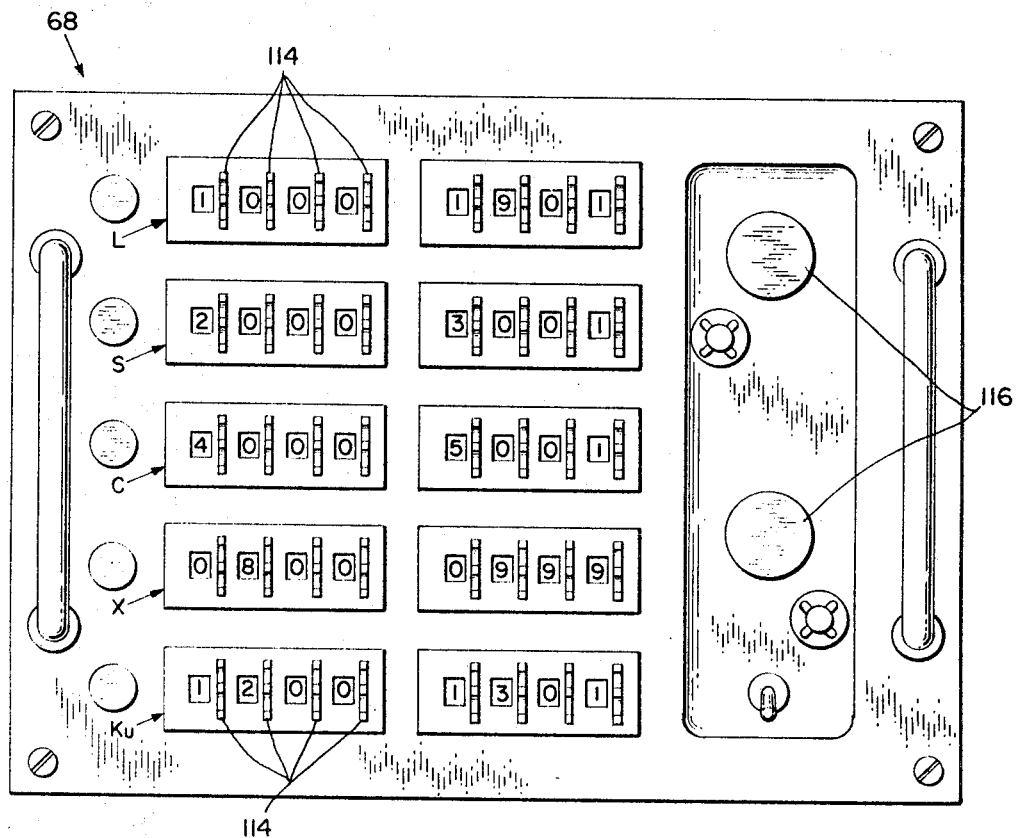
FIG. 7 is a detailed view of the digital tuning unit of FIG. 1.

The digital tuning unit 68 shown in FIGURES 1, 2 and 5 of the drawings is illustrated in greater detail in FIG. 7. It controls selection of scanning of the 1 to 18 gHz. spectrum, and has 10 sets of thumbwheel switches 114 (with four switches to a set) to allow pre-setting start-sweep and stop-sweep points in all of the the five microwave bands. Adjacent to each thumbwheel switch 114 is a numeral which serves to indicate the position or setting of that particular switch. These switches control the operation of a sweep counter which consists of 6 decade counters defining tuning increments between 1 and 18 gHz. in 100 kc./sec. steps. A matrix connected to the 1 and 10 gHz. decade counters performs band switching. The digital tuning unit 68 also has front panel controls 116 for adjusting sweep speed and sweep threshold, plus a switch for selecting sector or continuous sweep mode of operation. When set in the continuous sweep mode, the counter scans the entire 1 to 18 gHz. spectrum without regard to settings of the thumbwheel switches. Sweeping speed is continuously adjustable from .3 to 300 gHz. per second. Signal lock-on is controlled by the threshold adjustment which determines the minimum signal-to-noise ratio necessary to deactivate automatic sweeping action.

(b) *Receiver control unit*

The receiver control unit 72 of FIGS. 1, 2 and 5 operates in conjunction with the digital tuning unit 68 to provide the dynamic tuning control for the microwave surveillance system of the present invention. The receiver control unit 72 is fundamentally a remote control head for the RF tuners 14 through 22. The unit 72 is employed to control received signal mode IF band width and mode, signal attenuation, manual sweep start-stop, manual tuning, and to indicate the particular band being swept. Push-switch type indicators are used for displaying which band is being swept. The switch portion of these indicators may be employed to stop the sweep at any point within a band, or may be operated to stop the sweeping action at the lower limit of any desired band. For operator convenience, a single manual tune control and a three-speed fast tune lever (which operates in two directions) are provided. The manual tuning control tunes 10 mHz. per turn of the dial in discrete steps of 100 kc. The fast tune lever is a spring-return-to-center type that is "off" in the center position, and which gives 3 fast-tuning speeds to increase or decrease frequency.

(c) *Frequency memory unit*

The frequency memory unit 118 is used primarily to provide automatic bandwidth lock-out capability for the receiver system of the present invention. It may be programmed to lock out up to 20 mHz. segments of the spectrum which are of no interest, whether signals are present or not. This equipment has a word-organized memory with storage for 18 frequencies to .1 mHz. resolution. Although used to control the receiver system, its operation is subordinate to that of the digital tuning unit 68. The frequency memory unit 118 has 4 mutually exclusive modes of operation. Three of these modes enables the operator to alter or sample the contents of the memory. The fourth mode, sweep, performs the bandwidth lockout function. This bandwidth lockout function enables the operator to quickly scan for new signals without having to personally discern between old and new signals, and to prevent his having continually to re-start the sweep each time and old signal is encountered. It performs this function by overrriding signal intercepts whose frequencies lie within the bandwidth limits stored within the 18 memory cells. When an intercept occurs, the memory is interrogated, and a comparison made between the frequencies in storage and the present intercept frequency of the sweep counter. If a coincidence occurs, a resume-sweep gating signal is generated that automatically causes the receiver to continue its sweeping. On demand, the operator may select any frequency memory location and load the contents into the sweep counter. This automatically sets up the receiver to within 100 kc. of the programed frequency, thereby enabling the operator to ascertain if the emitter is still radiating.

(3) SIGNAL ANALYSIS

Signal analysis for the microwave surveillance system of the present invention is provided by three units: (a) the spectrum display unit, (b) the direction finding display unit, and (c) the IF pan display unit.

(a) Spectrum display unit

The spectrum display unit 120 shown in FIGS. 1, 2, and 5 provides the operator with a panoramic presentation of received signals as the system sweeps the microwave spectrum. The unit incorporates a 5-trace cathode-ray tube with optional provisions for trace photography through the rear of the tube. Each trace represents one of the five microwave bands, and is correspondingly calibrated on one layer of a double-layer cathode-ray tube graticule. Video information, fed to each electron gun of the cathode-ray tube, is selectable in bandwidth. Analog tuning voltages are brought into the horizontal amplifiers for horizontal deflection, and a strobe marker is provided for each of the five traces.

For the purpose of viewing repetitive pulsed signals wherein the time parameters may be of interest, the presentation can be switched to a conventional time display. This can be made to occur at any discrete point of the spectrum by energizing a strobe lock-on circuit. Trace presentation and calibration is automatically switched to enable visual examination of pulse duration and pulse repetition frequency. This is accomplished by automatically illuminating the second layer of the double-layer cathode-ray tube graticule while the first layer illumination is extinguished. Athough several emitters within the receiver bandwidth may be detected, only one pulse train from an incoming multiple pulse train will be displayed if the gating circuit is on. The time display feature of the spectrum display unit 120 assists the operator in setting up the pulse gate for proper functioning, and provides supporting data for information displayed in digital form by an analysis indicator unit 122.

(b) DF display unit

The console 10 of FIGURE 1 is provided with a DF display unit 124 which permits the operator to make a true bearing on intercepted signals. A PRF gate is provided which prevents undesired signals from being displayed. This bearing is automatically entered in the analysis indicator 122 for transmission and/or readout. Its operation is coordinatied with the high-speed rotating antennas 24, 28 and 32. The control amplifier 42 contains a video amplifier, pulse stretcher and power supply of standard design.

(c) IF pan display unit

The IF pan display unit 112 of FIGURES 1, 2 and 5 of the drawings is a single-trace oscilloscope that provides a visual presentation or panoramic display of all signals in the receiver IF passband. The horizontal axis represents frequency, and displays 20 mHz., 5 mHz. or 1 mHz. segments of the IF passband depending upon which band is selected by the receiver control unit 72. The vertical axis represents signal amplitude. The IF pan display unit 112 is interconnected with the demodulator unit 66 as shown in FIGURE 5 of the drawing. It should be noted that signals within the IF passband may be examined on the IF pan display unit 112 whenever the sweep has stopped or the receiver is being manually tuned.

(4) SIGNAL RECORDING

The analysis indicator 122 is employed for signal recording in conjunction with a standard teletype printout unit.

Analysis indicator

The analysis indicator unit 122 of FIGURES 1, 2 and 5 provides the operator with digital information pertaining to the frequency, pulse duration, and pulse repetition period of incoming signals which have been intercepted by the receiver system. All information is displayed in digital form on alpha-numeric display tubes. Frequency is displayed to 6 digits, down to 100 kilocycle per second increments; pulse duration is displayed to 4 digits, down to .1 microsecond; and pulse repetition period to 5 digits, down to 1 microsecond periods. All displayed information may be temporarily stored for subsequent data transmission.

The analysis indicator unit 122 is used whenever the receiver is not sweeping. Once the receiver intercepts a signal, the operator may automatically store information of frequency, pulse direction, pulse repetition period, and true bearing of the signal. After this data is stored, the operator may at his convenience enter latitude, longitude, aircraft number (if airborne), operator number, and type of signal on 12 thumbwheel switches located on the front panel of the unit, these thumbwheel switches being of a type identical to those employed in the digital tuning unit 68 (FIG. 7).

After all pertinent information is entered and stored, the data may be simultaneously transmitted and printed out locally. Circuits are included for converting this data to teletype format. If the transmitter is not available, the data will remain stored until such time as it may be transmitted, and sweeping may be continued. The first block of data will remain stored even while the receiver is searching for additional signals.

If a second signal is encountered, the first data block must be transmitted or printed out locally. This must be accomplished prior to storing the second information block, since storage automatically erases previously-entered data. If required, any number of data blocks may be recorded locally in this manner and then manually retransmitted by teletype at a later time. One possible data format for local printout and transmission is shown below, and is suitable for use when the invention apparatus is installed on an aircraft:

| Data | Digits |
|---|---|
| Aircraft number | 00 |
| Operator number | 0 |
| Frequency (mHz.) | 00000.0 |
| Type of signal | 0 |
| Pulse duration ($\mu$sec.) | 000.0 |
| Pulse repetition period ($\mu$sec.) | 00000 |
| Time (hours, minutes and seconds) | 00 00 00 |
| Latitude (degrees and minutes) | 00 00 |
| Longitude (degrees and minutes) | 00 00 |
| True bearing (degrees) | 0 00 |

Figure 8:
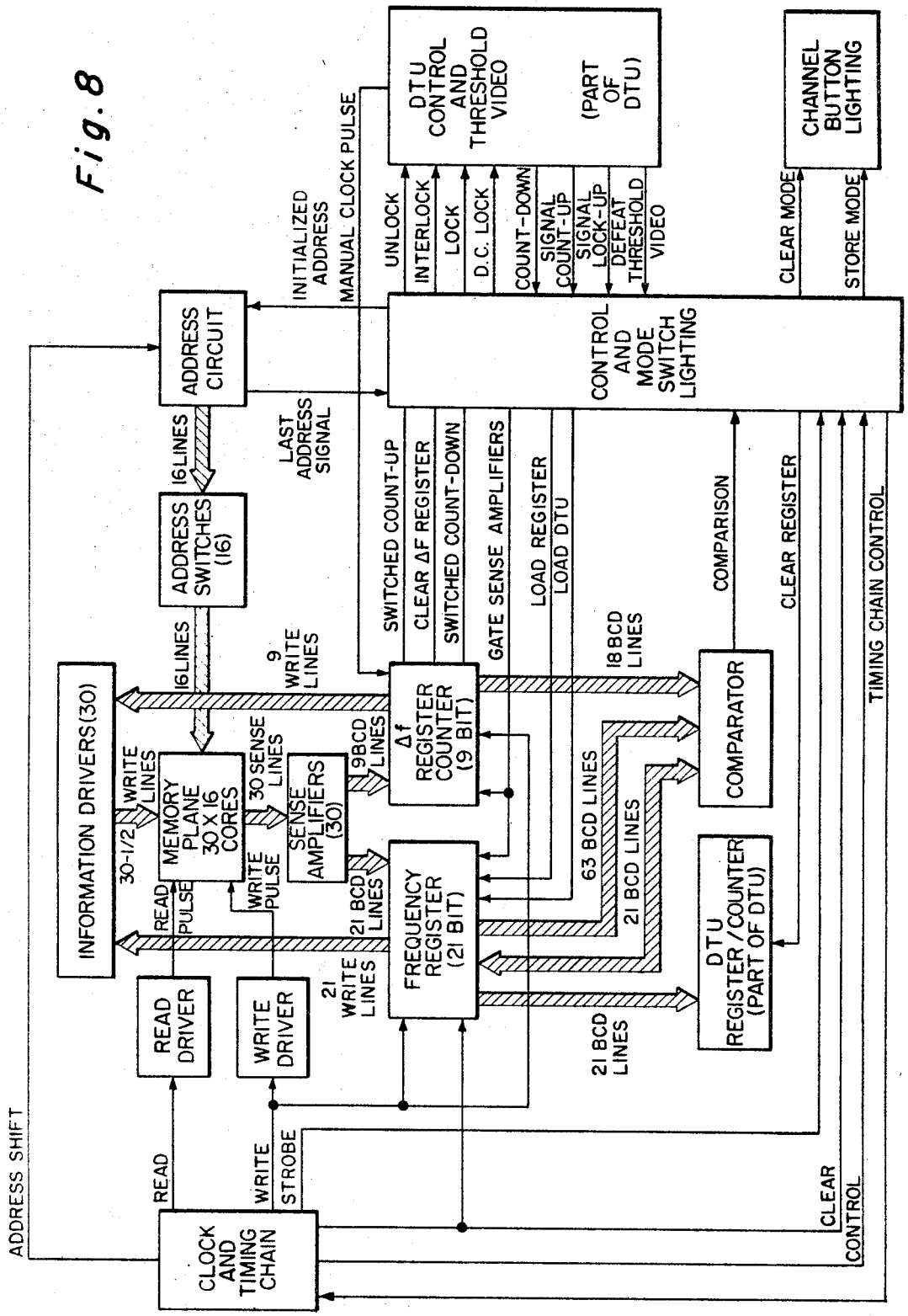
FIG. 8 is a block diagram of the frequency memory unit of FIG. 2.

A block diagram of the frequency memory unit 118 of FIGURES 1 and 2 is set forth in FIGURE 8 of the drawings. The memory capability of the unit of FIG. 8 embraces the storage of frequency and bandwidth data necessary for identification of 16 signals. In other words, the frequency memory unit of FIG. 8 contains 16 lockout channels. Each channel may be set to the frequency limits of the desired lockout. Once a frequency is stored in any of the 16 channels, the invention apparatus (while in automatic mode of operation) will not stop sweeping, even though a signal may appear within these limits. This provision prevents the arrangement of FIG. 8 from automatically stopping each time it sweeps a desired frequency band, and relieves the operator from having continuously to use a "push-to-sweep" button on the receiver control unit 72.

To store a frequency, the tune control on the receiver control unit 72 is adjusted to the upper limit of the signal or frequency desired to be locked out. In addition, the STORE and ΔF buttons are depressed, and the tune control on the unit 72 is turned to the lower limit of the signal or lower frequency limit of lockout. To store the desired frequency lockout bandwidth in the frequency memory unit of FIG. 8, one of the empty storage channel push buttons is actuated. The arrangement is such that if the light on a push button is out, this is an indication of an empty channel. Then the sweep push button is depressed, and storage of this channel information is effected. Data in other channels may be stored in a like manner.

To erase information which has been stored in any channel, it is only necessary to depress that channel's storage push button after the erase push button has been actuated. This procedure clears the information and the channel is then ready for restoring new information.

If it is desired to return the receiver to any particular channel (or to the lower limit of a locked-out band of frequencies previously stored) it is only necessary to depress the desired storage channel button after depressing the RECALL push button. The system of FIG. 8 will then automatically return to that frequency. This allows the operator to inspect the signal on the IF pan display unit 112. By such inspection, he can insure that no small or large signals have apepared in the bandwidth of the desired signal under protection. In normal operation, the invention apparatus will be operating in sweep (that is, automatic) mode, and the receiver will lock on to any new signal within its desired sweep frequency that has not been registered in the memory unit of FIG. 8.

After storing, erasing or recalling a frequency by the system of FIG. 8, receiver sweeping may be resumed by first depressing the SWEEP button on the memory unit 118, and then pushing the SWEEP button on the receiver control unit 72.

Summarizing the above, a memory system is included with capabilities for storage of frequency and bandwidth necessary for identification of 16 signals. Once a signal is in storage, by operating a recall control the receiver will tune directly to that frequency. A switch is provided to clear any memory channel to allow setting up a new frequency. The sweep does not lock on to a signal that has been recorded in the memory unit, except for a 120-microsecond period required to ensure that the signal has been recorded in the memory. Adjustable manual controls are provided to establish the upper and lower limits of the band of frequencies that represent the signal that is locked out. The adjustments are from +.1 mHz. to +19.9 mHz. of the low-frequency end of the band. The increments of adjustment are .1 mHz. The IF pan display unit 112 indicates the position of the limits relative to the signal as they are being adjusted for memory.

(5) DATA TRANSMISSION

A short-term storage device is incorporated into the analysis indicator unit 122 for storage of digital readout information of one signal to be transmitted or sent by teletype (see FIG. 2). This device records information only when the receiver is locked on to a signal, and automatically clears whenever sweep is resumed. An override switch is provided to store information indefinitely, even though the sweep is resumed. No new information can be admitted under this condition. However, the operator may press a switch and the stored information is sent in sequence to the conversion circuitry located in the analysis indicator unit 122. A storage register automatically stores data as to pulse width, pulse repetition period, true bearing and frequency, with additional inputs for aircraft number (if appropriate), latitude and longitude, operator number, and time, with two spare memory inputs. Appropriate circuitry is also included in the analysis indicator unit 122 for changing digital information into teletype format, such, for example, as the standard 7.42 teletype format for 60 or 100 words per minute.

Obviously many modifications and variations of the present invention are possible in the light of the above teachings. It is therefore to be understood that within the scope of the appended claims the invention may be practiced otherwise than as specifically described.

I claim:
1. An electromagnetic surveillance system for monitoring a wide frequency spectrum and ascertaining preselected characteristics of received signals lying within such spectrum, said system comprising:
   antenna means for receiving said signals;
   a plurality of tuners connected to said antenna means, each tuner covering a different particular portion of said spectrum, such that the signals received by said antenna means are divided into a plurality of frequency bands equal in number to the number of tuners;
   means for demodulating the signal output of said tuners;
   a spectrum display unit connected to said demodulating means;
   means for electronically sweeping the said frequency spectrum as represented by the output of said demodulating means so as to develop on said display unit a plurality of separate visual presentations equal in number to the number of frequency bands into which the received signals are divided by said tuners;
   a signal analyzer connected to said demodulating means;
   means for applying to said analyzer a particular signal selected from those visually presented on said display unit, said signal analyzer acting to yield information as to the frequency, time duration, and repetition rate of the particular signal so selected;
   a memory unit;
   means for applying to said memory unit a particular signal or signals selected from those visually presented on said display unit, said memory unit acting to store therewithin the particular signal or signals selected for application thereto;
   means for sampling the contents of said memory unit to ascertain the nature of the signal or signals stored therewithin; and
   means for recording and/or transmitting to a remote point the contents of said memory unit.

2. An electromagnetic surveillance system according to claim 1, in which said means for electronically sweeping the frequency spectrum includes means for automatically switching between the said plurality of frequency bands into which the signals received by said antenna means are divided.

3. An electromagnetic surveillance system according to claim 1, in which each of said plurality of tuners is provided with manually-actuable means for setting the upper and lower limits of that particular frequency band with which such tuner is associated.

4. An electromagnetic surveillance system according to claim 1, in which said antenna means includes a plurality of antennas each designed to receive signals lying within a different particular portion of the frequency spectrum, at least one of said antennas covering more than one of the said frequency bands into which signals received by the said antenna means are divided.

5. An electromagnetic surveillance system according to claim 1, in which said antenna means includes at least one directional antenna, and in which said system further includes a direction-finding device upon which may be visually presented the true bearing of a particular signal selected from those visually presented on said spectrum display unit.

6. The combination of claim 5, further including means for entering in said signal analyzer the true bearing of a particular selected signal as visually presented on said direction-finding device.

7. A panoramic receiver designed to monitor a wide frequency spectrum, said receiver including:
   means for electronically sweeping the said frequency spectrum to detect signals appearing therein;
   means for visually displaying signals so detected by said spectrum-sweeping means;
   means for analyzing selected ones of the signals so displayed to ascertain pre-determined characteristics thereof;
   means for visually displaying the pre-determined characteristics of the selected signals so analyzed;
   a memory for storing the pre-determined characteristics of the selected signals so analyzed and displayed; and
   means for recording and/or transmitting the contents of said memory.

8. A panoramic receiver according to claim 7, in which said means for visually displaying the pre-determined characteristics of the selected signals so analyzed includes means for effecting such visual presentation in digital form.

9. A panoramic receiver according to claim 8, in which the pre-determined characteristics of the selected signals include information as to their frequency, time duration, and repetition period.

10. A panoramic receiver according to claim 8, further including means for determining the true bearing of the signals selected for analysis from those presented by said visual display means.

References Cited
UNITED STATES PATENTS

| | | | |
|---|---|---|---|
| 3,060,427 | 10/1962 | Jaffe et al. | 343—118 |
| 3,374,436 | 3/1968 | Thiess | 324—77 X |
| 3,382,436 | 5/1968 | Wu | 324—77 X |

RODNEY D. BENNETT, JR., *Primary Examiner.*

CHARLES L. WHITMAN, *Assistant Examiner.*

U.S. Cl. X.R.

324—77; 325—334, 336; 343—118